United States Patent [19]

Solal et al.

[11] Patent Number: 5,020,034

[45] Date of Patent: May 28, 1991

[54] DIRECTIONAL ANTENNA WITH MULTIPLE TRANSDUCERS, IN PARTICULAR FOR A SONAR

[75] Inventors: Marc Solal, Nice; Jean-Francois Gelly, Valbonne, both of France

[73] Assignee: Thomson CSF, Paris, France

[21] Appl. No.: 167,487

[22] Filed: Mar. 7, 1988

[30] Foreign Application Priority Data

Mar. 6, 1987 [FR] France ............................... 87 03072

[51] Int. Cl.$^5$ ................................................ G01S 3/06

[52] U.S. Cl. ...................................... 367/138; 367/12; 367/905; 73/626

[58] Field of Search ................ 367/12, 105, 905, 138; 364/577, 723; 73/626

[56] References Cited

U.S. PATENT DOCUMENTS

| | | | |
|---|---|---|---|
| 3,859,622 | 1/1975 | Hutchison et al. | 367/105 |
| 4,060,792 | 11/1977 | Van Heyningen | 367/905 X |
| 4,170,766 | 10/1979 | Pridham et al. | 367/135 |
| 4,291,396 | 9/1981 | Martin | 367/905 X |
| 4,301,522 | 11/1981 | Guyot et al. | 367/905 X |
| 4,307,613 | 12/1981 | Fox | 367/105 X |
| 4,787,392 | 11/1988 | Saugeon | 367/103 |

*Primary Examiner*—Thomas H. Tarcza
*Assistant Examiner*—Tod Swann
*Attorney, Agent, or Firm*—Cushman, Darby & Cushman

[57] ABSTRACT

Antenna, in particular for a sonar, allowing to form directional channels by feeding the transducers by a reduced number of sources by means of an interpolation network that permits to maintain to a low level the image lobes in spite of this reduction of the number of sources.

9 Claims, 6 Drawing Sheets

FIG_4
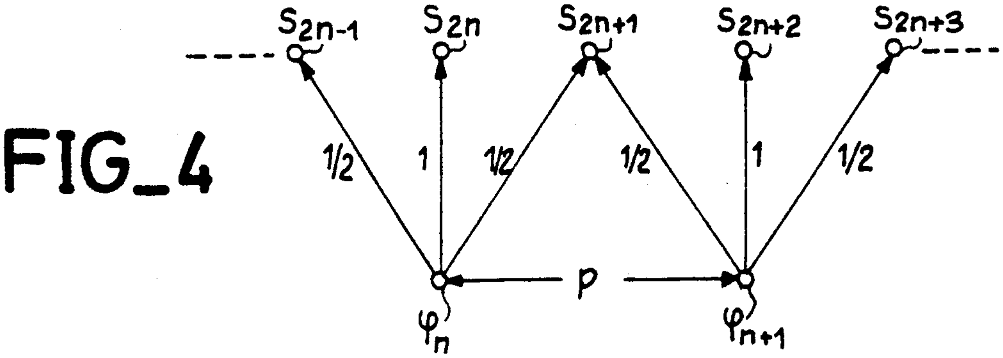
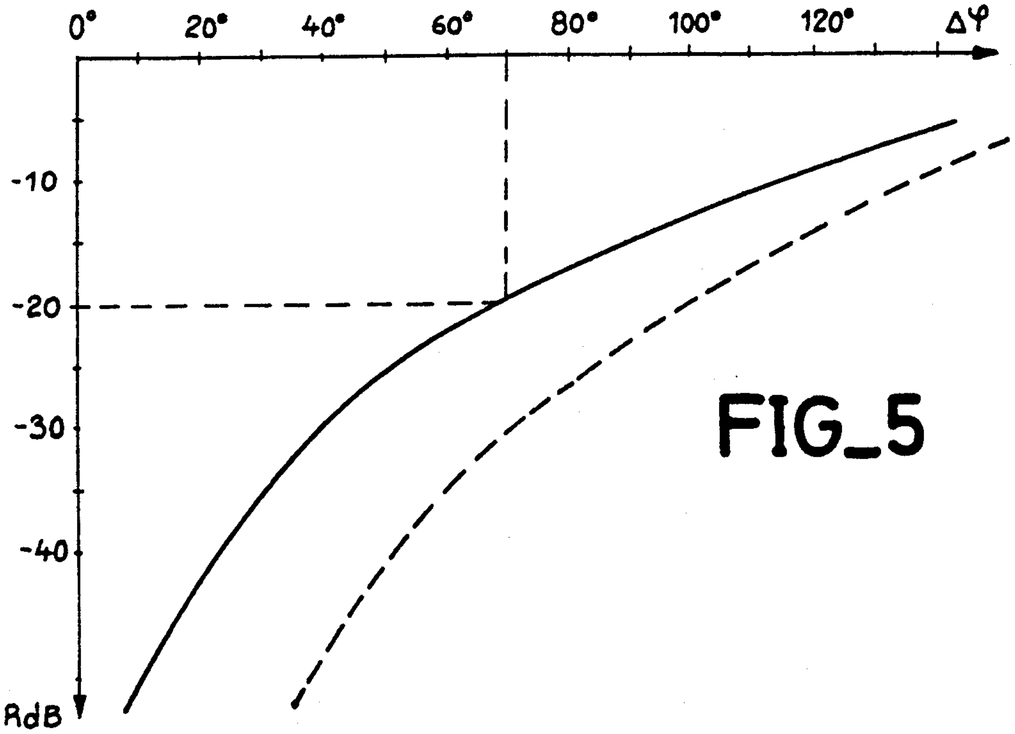
FIG_5
FIG_6
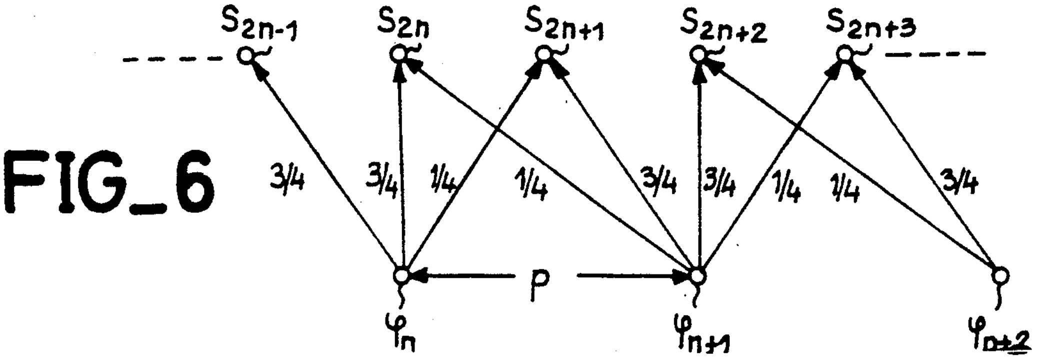

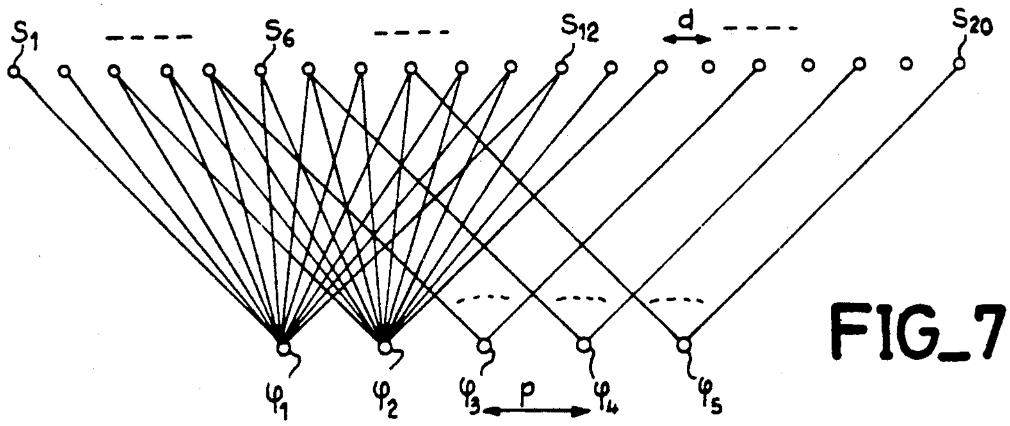
FIG_7
FIG_8
| $\sin\theta_0$ | 0,04 | 0,08 | 0,12 | 0,16 | 0,2 | 0,24 | 0,28 | 0,32 | 0,36 | 0,38 |
|---|---|---|---|---|---|---|---|---|---|---|
| R(dB) | -57 | -50 | -46 | -56 | -36 | -33 | -54 | -21 | -9 | -4,5 |
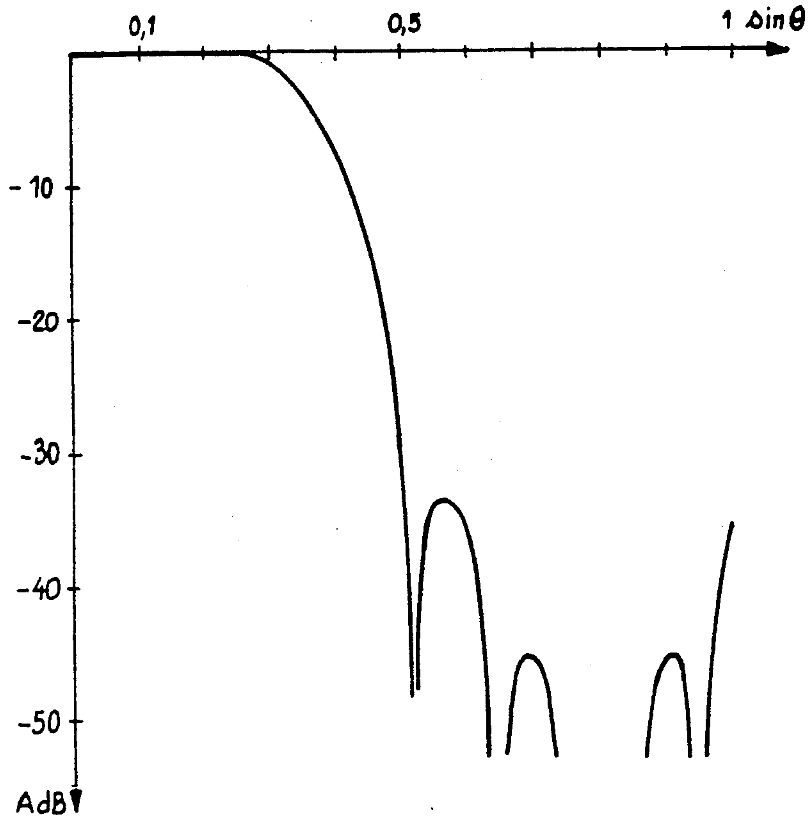
FIG_9

DIRECTIONAL ANTENNA WITH MULTIPLE TRANSDUCERS, IN PARTICULAR FOR A SONAR

BACKGROUND OF THE INVENTION

1. Field of the Invention

The present invention relates to directional antennae with multiple transducers, that either comprise a reduced number of the electronic channels necessary for feeding these transducers while having the same performance, in particular with respect to the level of the image lobes, or have higher performance for the same number of channels, and then includes a greater number of transducers.

The present invention is applicable in particular to sonar antennae and to sonography probes, as well for transmission as for reception. The term "feed" is used here in the broad sense as is usual for antennae, in particular microwave antennae, where it is usual to speak of a feed illuminating a reflector, even in the case of an antenna used in the reception mode. The remaining of this description will deal essentially with transmitters but the reciprocal case of the receiver will always be implied.

2. Description of the Prior Art

It is usual, as in FIG. 1, to use a linear array of transducers 10 with a width 1 and pitch d, each of these transducers being fed by a generator (or source) 20.

To generate a plane wave with a wavelength λ offset by an angle $\theta_0$ with respect to the normal to the array, the successive phase shifts Δφ between the generators must be such that:

$$\Delta\phi=\phi_{n+1}-\phi_n=(2\pi d/\lambda)\sin\theta_0.$$

The amplitude of the signals furnished by the generators follows a law that allows to shape the form of the radiation pattern. This directivity pattern D(θ) is the product of the array pattern R(θ) and the elemental pattern E(θ) of each transducer: $D(\theta)=R(\theta)\times E(\theta)$.

It is known that the pattern R(θ) is periodic with a period in sin θ equal to λ/d, which corresponds to phasing the waves again. Consequently, if the beam is pointed in a direction $\theta_0$, this gives rise to image lobes in the directions θ such that $\sin\theta=\sin\theta_0\pm k(\lambda/d)$ with k=1, 2, . . .

If the length 1 of the transducers is very small compared to λ, then E(θ)=1 for an θ and the image lobes have the same amplitude as the main lobe. The images lobes whose directions are such that $-1<\sin\theta<1$ are disturbing because they produce in the image undesired echoes that do not correspond to the direction of the formed channel and that may even mask an echo located in the pointing direction.

If these image lobes are not to be disturbing whatever the direction $\theta_0$, it is necessary, according to the well-known rule, that $d<\lambda/2$. If $\theta_0$ is restricted to $\theta_{max}$, we may increase d within a limit given by the relation $d<\lambda/(1+|\sin\theta_{max}|)$.

Consequently, if $\theta_0$ is restricted to the only direction 0°, we have $d<\lambda$.

In general the transducers are not punctiform and the amplitude E(Q) depends on the length 1 of the transducer compared to λ according to the relation:

$$E(\theta)=\left[\sin\left(\frac{\pi l}{\lambda}\sin\theta\right)\Big/\left(\frac{\pi l}{\lambda}\sin\theta\right)\right].$$

The dimension 1 should not be to large so as not to attenuate excessively the main lobe in the directions $\theta_{max}$. For example, if we admit an attenuation of −1dB for the directions $\pm\theta_{max}$, we must have $1/\lambda<0.26/\sin\theta_{max}$.

For $\theta_{max}=20°$, the length 1 is shorter than 0.75λ. As an example, FIG. 2 shows the directivity pattern obtained as a function of sin θ for an antenna with 18 transducers with a pitch of 1.5λ, each transducer having a length of 0.75λ, for $\sin\theta_0=0.18$, that is θ=10°. The curve in dashed line corresponds to the directivity pattern of an elemental transducer.

The image lobes 21 and 22 are located at −1.6 and −6.7 dB, respectively, under the main lobe 20 for sin θ=0.66, which is disturbing and shows that the elemental pattern in this example is not sufficiently selective.

The only solution to reduce the level of the image lobes consists in reducing the pitch between the transducers. Thus, by doubling the number of transducers to obtain an antenna with 36 transducers with the pitch of 0.75λ, the first image lobes will be pushed away on either side of the main lobe to a distance such that sin θ=1.33 . . . , i.e., twice the preceding one. The image lobes go then out of the real domain and are consequently eliminated.

The condition $d<\lambda/(1+|\sin\theta_{max}|)$ indicated above amounts to say that the phase differences at the transducers do not exceed 2π between two successive transducers. These phases are called "acoustic phases".

In the prior art, the transducers are connected respectively to so many generators for transmission, or to so many reception system for reception, as there are transducers. The acoustic phases correspond then to so many electrical phases.

SUMMARY OF THE INVENTION

According to the present invention, the number of electrical phase used is at most equal to half the number of acoustic phases. To this end, a coupling is introduced between the transducers, which amounts to perform an interpolation between the electrical and acoustic phases.

BRIEF DESCRIPTION OF THE DRAWINGS

Other features and advantages of the invention will become apparent from the following detailed description given as a non-limitative example with reference to the accompanying drawings, in which:

FIG. 4 is a first example of interpolation;

FIG. 5 is an attenuation curve corresponding to this first example;

FIG. 6 is a second example of interpolation;

FIG. 7 is a third example of interpolation;

FIG. 8 is a table of values relating to this third example;

FIG. 9 is a directivity pattern relating to this third example;

DESCRIPTION OF A PREFERRED EMBODIMENT

Figure 1:
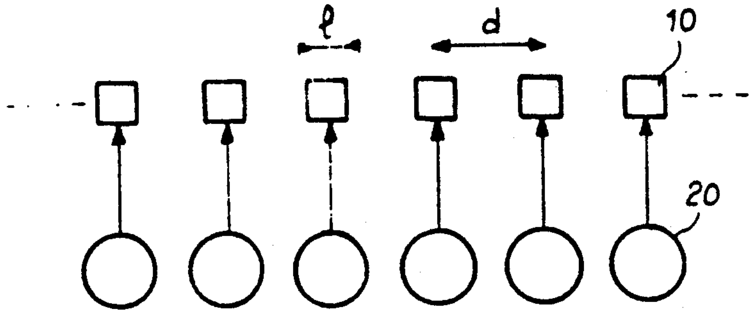
FIG. 1 is a schematic of the feed of an antenna of the prior art.
Figure 2:
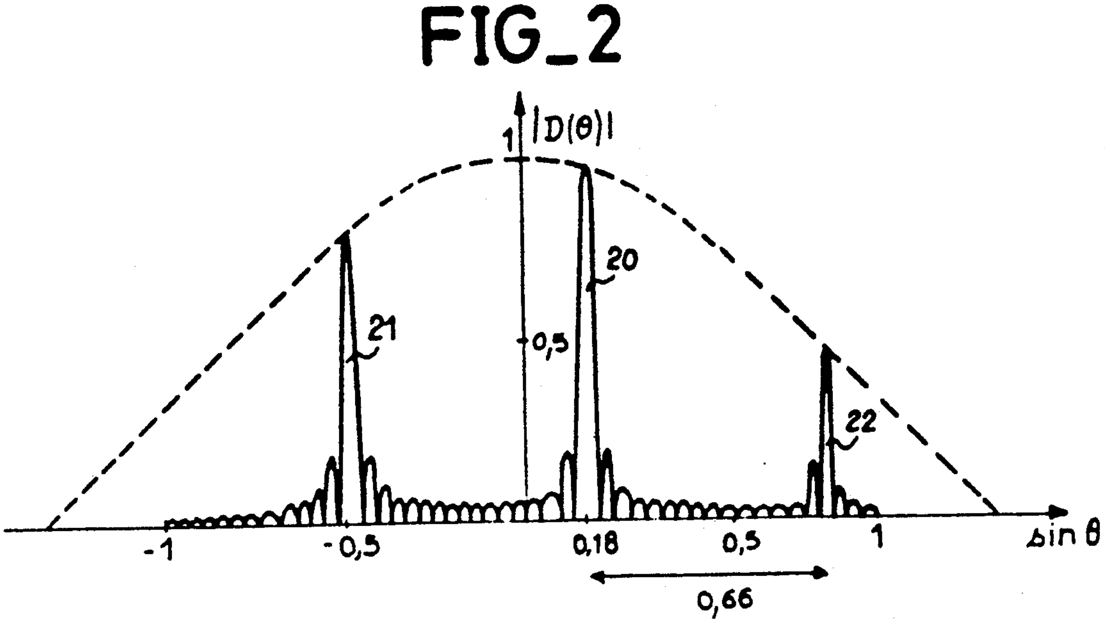
FIG. 2 is the radiation pattern of such an antenna.
Figure 3:
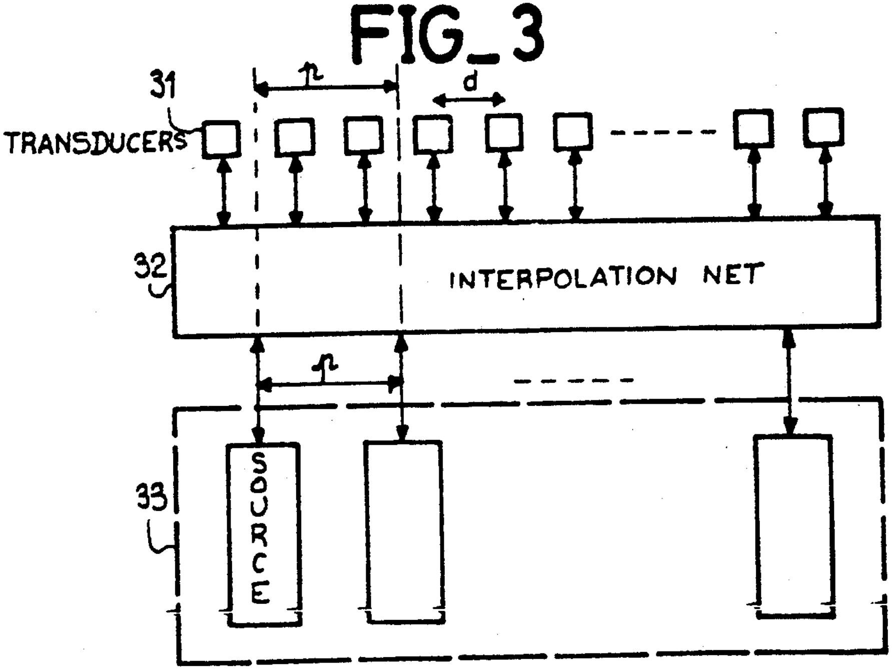
FIG. 3 is the block diagram of the feed of an antenna according to the present invention.

In FIG. 3, there is shown the block diagram of a system according to the present invention comprising an antenna made up of evenly distributed transducers 31 spaced by d, a group 33 of phase generators and/or evenly distributed receivers with a pitch p that will be called "electrical pitch", such that $p>2d$, and an interpolation (or coupling) network connecting the antenna 31 to the group 33. In this Figure, we have $p=3d$.

The antenna is properly sampled, i.e., $d<\lambda/(1+|\sin\theta_{max}|)$. However, the pitch p is such that if it corresponded to an acoustic pitch, it would not satisfy the previous condition, i.e., there would be real image lobes.

Generally, the interpolation network consists in connecting a generator to several transducers; a transducer is thus connected to several generators by applying to these connections a weighting that can be complex (amplitude and phase) or only real (amplitude).

If the interpolation of the phases is not perfect, the directivity pattern $D(\theta)$ will exhibit image lobes in the directions such that:

$$\sin\theta=\sin\theta_0\pm(k/p) \text{ with } (k=1,2)$$

where p is the electrical pitch, the level of these image lobes depending on the accuracy of the interpolation.

There are known interpolation techniques in the time domain. They allow to create intermediate samples (oversampling) between the successive samples of a signal provided this base signal is not undersampled. According to the sampling theorem, the highest frequency of the signal must not exceed half the sampling frequency, i.e., the phase rotation between two successive samples of the signal must not exceed $\pi$.

The electrical phase shift between two successive generators is given by the formula $\Delta\phi=(2\pi p/\lambda)\sin\theta_0$. Consequently, for a given maximum angular offset $\theta_{max}$, the pitch p must not exceed the value $p=\lambda/2\sin\theta_{max}$ in order to satisfy the sampling theorem applied here in space.

In a first example of interpolation shown schematically in FIG. 4, there is used a group of generators of phase $\phi_n$ feeding a group of transducers $S_{2n}$ whose number is twice that of the generators. The interpolation is performed by feeding directly every other transducer (2n) by a generator (n) and the intermediate transducers (2n+1) by the generators feeding directly both adjacent transducers. The signals from these generators are added vectorially after weighting by a ½-factor.

The signals applied to the transducers are given by the formulas:

$$S_{2n}=e^{j\phi_n}$$

$$S_{2n+1}=0.5\,e^{j\phi_n}+0.5\,e^{j\phi_{n+1}}$$

-continued $$S_{2n+2}=e^{j\phi_{n+1}}.$$

If we put $\Delta\phi=\phi_{n+1}-\phi_n=(2\pi p/\lambda)\sin\theta_0$, the signal applied to the intermediate transducers has the form $S_{2n+}=\cos(\Delta\phi/2)e^{j(\phi_n\Delta\phi/2)}$, while the theoretical signal necessary for a perfect interpolation would be $e^{j(\phi_n 30\ \Delta\phi/2)}$. The resulting modulation produces image lobes in the directions $k\lambda/p$. The higher the value of $\theta$, hence the value of $\Delta\phi$, the higher the level of these image lobes.

It is possible to apply this weighting to the antenna described above as an example by retaining the 18 generators and using 36 transducers. The pitch p (for the generators) is, therefore, $1.5\lambda$. The first two image lobes are located in the directions corresponding to $\sin\theta_0\pm0.66$ and, for $\theta_0$ positive, the main image lobe (whose amplitude is the greatest) is located at $\sin\theta_0-0.66$.

FIG. 5 shows (curve in solid line) the ratio R between the amplitude of the main lobe and that of the main image lobe (in dB) as a function of the phase shift $\Delta\phi$.

It can be seen that in order to obtain a sufficient attenuation, for example greater than −20 dB, of this main image lobe, it is necessary that the angular offset remains relatively low, that is $\Delta\phi<70°$ and, therefore, $\theta_0<7.5°$ in this example.

To improve this result, it is possible to use a second example of interpolation of the same kind, i.e., linear, shown schematically in FIG. 6. In this second example, a transducer with an even rank 2n receives the signals from two successive sources with the ranks n and n+1 weighted by the factors ¾ and ¼, respectively, and a transducer with the odd rank 2n+1 receives the signals from these two successive sources, weighted by the factors ¼ and ¾, respectively. With this complication, it is possible to come closer to the theoretical distribution and the level of the main image lobe is lowered. For an antenna including the same transducers and the same generators as previously but with such an interpolation, the relative level of this main image lobe is shown in dashed line in FIG. 5 that shows a significant performance improvement.

To further improve this result, it is possible to use in a third example of interpolation a non-linear weighting law applied to a greater number of transducers. This example is shown in FIG. 7 where there is represented an antenna comprising 20 transducers $S_1$ to $S_{20}$ with a pitch d, fed by five sources $\phi_1$ to $\phi_5$ with a pitch $p=2d$. Each source feeds 12 transducers with a weighting in amplitude corresponding to a law in sin X/X.

Thus the source $\phi_1$ feeds the transducers $S_1$ to $S_{12}$ with the weighting coefficients:

| | |
|---|---|
| $a_1=0.039$ | $S_1$ and $S_{12}$ |
| $a_2=0.047$ | $S_2$ and $S_{11}$ |
| $a_3=-0.111$ | $S_3$ and $S_{10}$ |
| $a_4=-0.16$ | $S_4$ and $S_9$ |
| $a_5=0.296$ | $S_5$ and $S_8$ |
| $a_6=0.879$ | $S_6$ and $S_7$. |

The source $\phi_2$ feeds the transducers $S_3$ to $S_{14}$ with the same set of weighting coefficients, and so on up to the source $\phi_5$ that feeds the transducers $S_9$ to $S_{20}$.

It is possible to increase the number S of sources and the number 2N of transducers provided the relation $(2N-10)/2=S$ is satisfied.

In the case of 15 sources and of 40 transducers with $p=1.25\lambda$, the values of the ratio R are indicated in the table of FIG. 8. It can be seen that this ratio is maintained very low up to $\sin \theta_0=0.32$ and then increases very rapidly. A ratio R lower than −20 dB results in $\theta_0<18.5°$, that is a value higher than that of the previous linear interpolation. It is to be noted that the maximum value $\theta_{max}$ of $\theta_0$ is 0.4 to satisfy the sampling theorem.

The directivity pattern representing the attenuation A as a function of the angular offset $\sin \theta$ is shown in FIG. 8 where it can be seen that the directivity is the product of the directivity of the array and the directivity of the subarray formed by the 12 weighted transducers. This directivity is close to a rectangular function since it represents the Fourier transform of the weighting in sin X/X. The lobes being modulated by this directivity, it is the latter that determines mainly the ratio R.

It can be understood that the ideal directivity for the sub-array is a rectangular directivity whose angular limits correspond to the sector of observation.

Such a weighting is particularly interesting in the case of an antenna of a medical probe. In this type of antenna, there is a group of evenly distributed transducers, and focusing is achieved electronically by applying delays to the signals. An image line is obtained from a subset of transducers and the whole image is obtained by electronic scanning of this subset. If the transducers are distributed along a straight line, the image obtained has a rectangular shape (linear array probe). It is also possible to obtain images with different shapes, in particular a sector shape, when the transducers are distributed along a curve.

In this case, there is no angular offset ($\theta_0=0$) and, therefore, the interpolation is fully possible, even with a relatively great pitch between the transducers. In addition, the size of the transducer can be great so as to attenuate as much as possible the image lobes.

The antenna is made up, for example, of about one hundred transducers, each subset comprising 30 transducers spaced by 1.25 λ and with a width equal to λ. The transmission frequency in this example is equal to 3.75 MHz.

Figure 10:
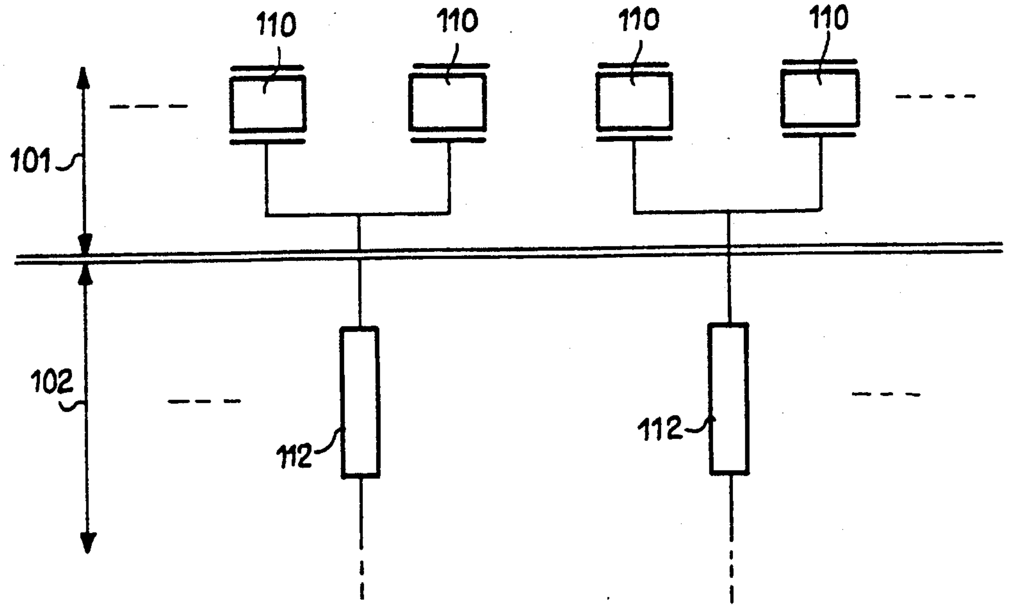
FIG. 10 is an example of connection of a medical probe according to the prior art.

In the prior art, as shown in FIG. 10, the transducers 110 of the probe 101 are fed from sources 112 contained in a processing electronics 102. This sources are twice less numerous than the transducers that are, therefore, connected by pairs in parallel with the sources without any particular coupling network.

Figure 11:
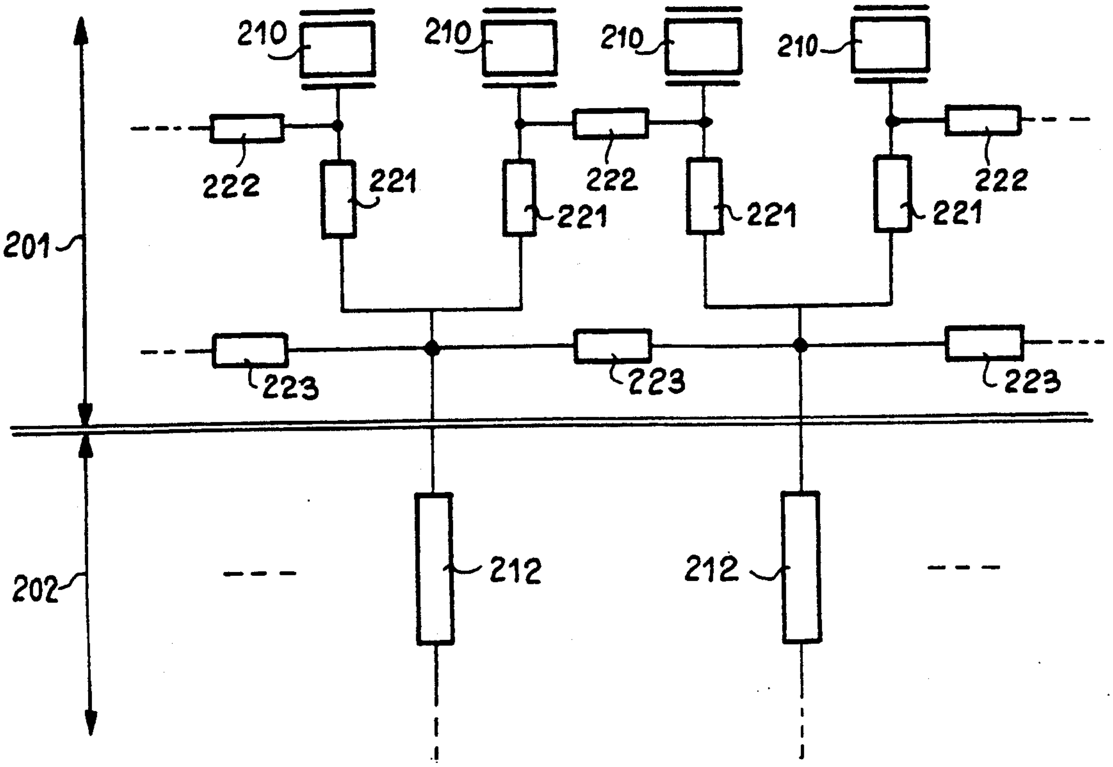
FIG. 11 is a fourth example of interpolation concerning the probe of FIG. 10.

According to the present invention, in a fourth example shown in FIG. 11, the processing electronics 202 is connected to the transducers 210 through a set of impedances 221, 222 and 223. One source 212 feeds two transducers 210 in parallel through two impedances 221. The adjacent sources are connected to each other through the impedances 223. The adjacent transducers fed by two adjacent sources are connected to each other through the impedances 222. These impedances are implemented with passive components: resistors, inductors and capacitors.

Figure 12:
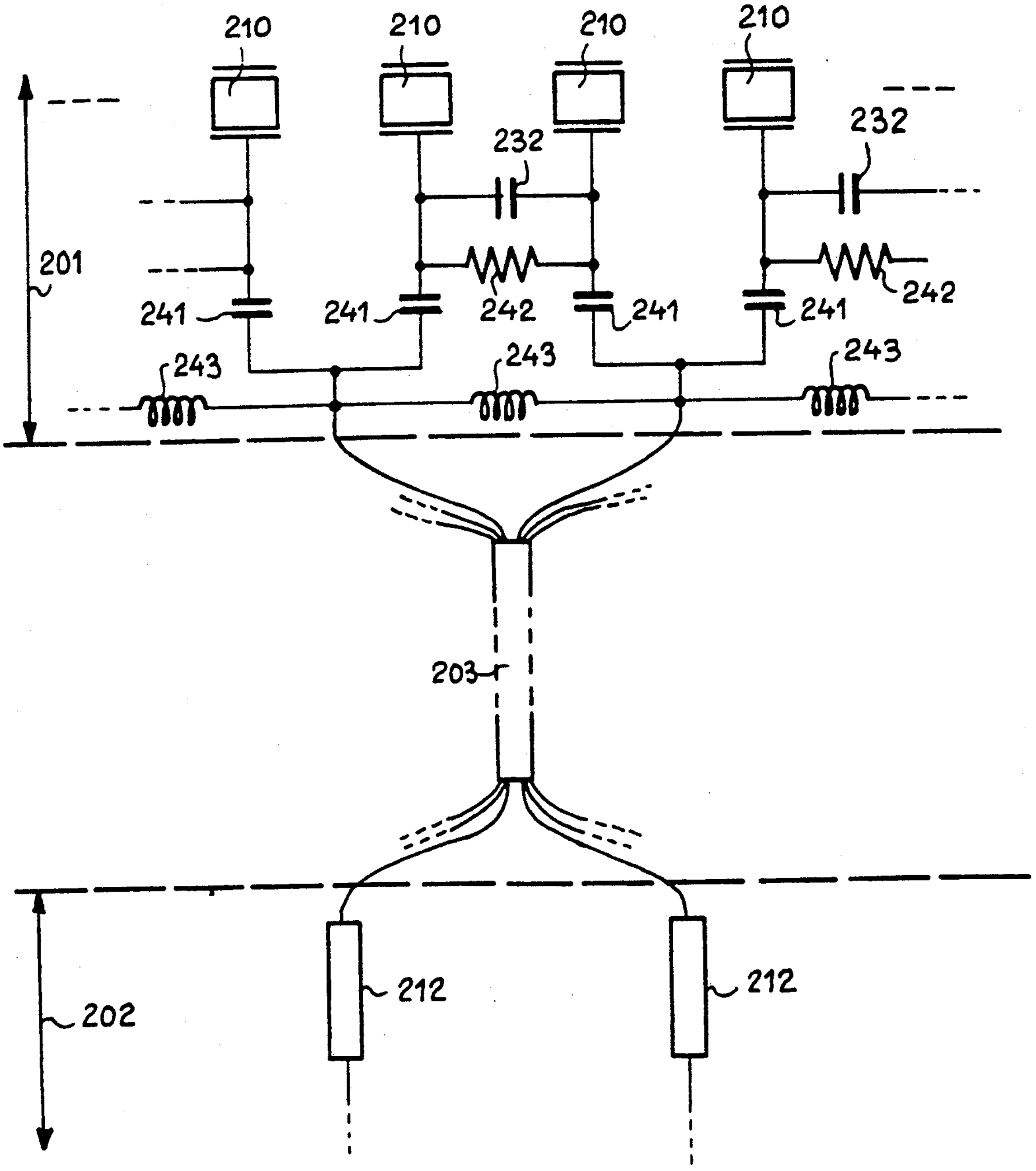
FIG. 12 is a preferred embodiment of the fourth example.

In a preferred embodiment of this fourth example, shown in FIG. 12, taking into account the fact that each elemental transducer 210 exhibits a resistance of 230 ohms and a capacitance of 75 picofarads, the impedances 221 are made up by a capacitor 241 of 300 pF, the impedances 222 of a resistor of 285 ohms in parallel with a capacitor of 255 pF, and the impedances 223 of an inductor of 21 microhenrys. These impedances can be accomplished directly in the body of the probe 201 and, therefore, require a number of wires in the connecting cord 203 between the probe 201 and the processing electronics equal to the number of sources and not to the number of transducers.

Figure 13:
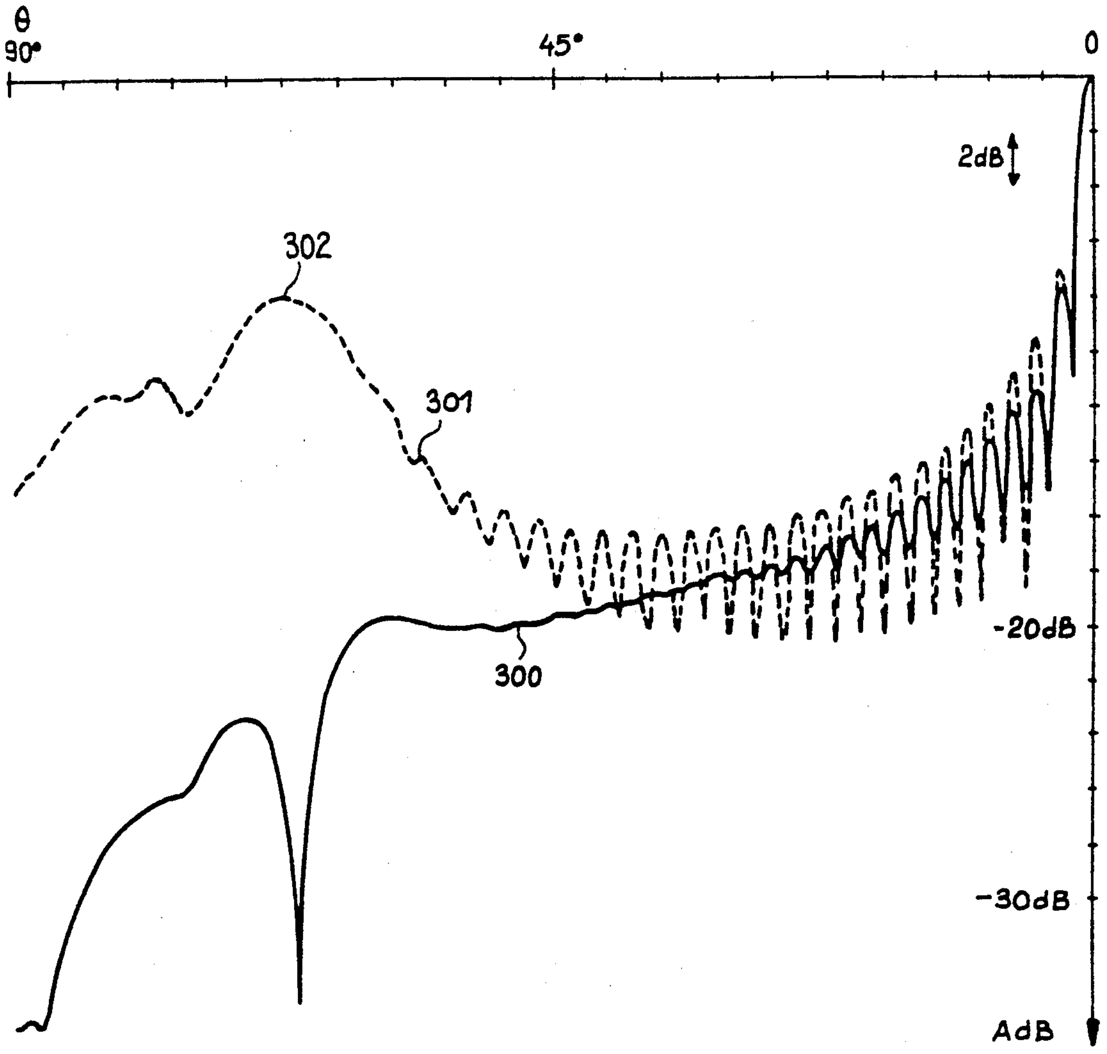
FIG. 13 is a directivity pattern relating to this embodiment.

FIG. 13 shows the directivity patterns of this embodiment (300) and of the prior art (301). One can see an attenuation of the level of the first image lobe 302 greater than 10 dB. These image lobes are also attenuated by a very marked smoothing effect of the ripple.

In this embodiment, the interpolation is obtained through a complex weighting, i.e., in amplitude and in phase, which allows to minimize the number of elements necessary to obtain the desired coupling compared to a resistor network.

The application of the invention to a focused transmitting-receiving antenna is furthermore particularly interesting because it permits to reduce the number of phase shifts required to perform this focusing both for transmission and for reception.

It is quite possible to increase the number of transducers while retaining the same number of processing systems and, therefore, the same number of wires in the connecting cord, by using a ratio greater than 2 between these numbers.

According a known technique, in particular in the case of a receiving antenna, the signals from the sensors are converted into digital samples and the interpolation is carried out digitally. The coupling network is then rather similar to a transversal filter.

Generally the present invention is applicable to any antenna, both for electromagnetic waves and ultrasonic waves. It can be a narrow-band antenna or a wide-band antenna.

It is interesting in that it simplifies the electronics of the system. It is mainly interesting at high frequencies (high directivities) in the case where focusing is used, i.e., for the high-resolution sonars and for the probes intended for diagnosis, in particular medical diagnosis.

Finally, the present invention also applied to two-dimensional antennae.

We claim:

1. A directional acoustic antenna, in particular for a sonar, comprising:
   - a group of transducers,
   - a group of sources for feeding said transducers to form at least one directional channel including undesired grating lobes, the number of sources being at most equal to half the number of transducers, and
   - an interpolation network for connecting said sources to the transducers while decreasing the amplitude of the grating lobes to a level of the same order of magnitude than that obtained with a number of sources equal to the number of transducers.

2. An antenna according to claim 1, wherein each source is connected to at least two transducers to feed them with signals weighted in amplitude.

3. An antenna according to claim 2, comprising a number N of sources and a number 2N of transducers, wherein the interpolation means allow to feed one transducer with the rank 2n by a source with a rank n with a weighting equal to 1, and a transducer with the rank 2n+1 with weightings equal to ½.

4. An antenna according to claim 2, comprising a number N of sources and a number 2N of transducers, wherein said interpolation means allow to feed a transducer with the rank 2n by two sources with the ranks n and n+1 with weightings equal to $\frac{3}{4}$ and $\frac{1}{4}$, respectively, and a transducer with the rank 2n+1 with weightings equal to $\frac{3}{4}$ and $\frac{1}{4}$, respectively.

5. An antenna according to claim 2, comprising a number S of sources and a number 2N>S of transducers, wherein said interpolation means allow to feed a group of L successive transducers by one source with weightings whose values follow a law in sin X/X.

6. An antenna according to claim 1, comprising a number N of sources and a number 2N of transducers, wherein said interpolation means comprise a first set of impedances to feed said transducers by pairs in parallel, a second set of impedances to connect to each other the adjacent transducers fed by two adjacent sources, and a third set of impedances to connect each source to the adjacent source.

7. An antenna according to claim 6, wherein said transducers have a resistance of 230 ohms and a capacitance of 75 picofarads, the impedances of said first set of impedances are capacitors with a capacitance of 300 picofarads, the impedances of said second set of impedances are resistors with a resistance of 285 ohms in parallel with capacitors of 255 pF, and the impedances of said third set of impedances are inductors with an inductance of 21 millihenrys.

8. An antenna according to claim 7, wherein said transducers and said impedances are grouped to form a focused ultrasonic probe for sonography.

9. An antenna according to claim 1, in the form of a two-dimensional antenna.

* * * * *